(12) United States Patent
Meredith et al.

(10) Patent No.: US 8,734,906 B2
(45) Date of Patent: *May 27, 2014

(54) FILMS AND METHOD OF PRODUCTION THEREOF

(75) Inventors: Paul Meredith, Brisbane (AU); Michael Harvey, Brisbane (AU); Robert Vogel, Brisbane (AU)

(73) Assignee: Brismat Inc., Menlo Park, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/065,218

(22) Filed: Mar. 16, 2011

(65) Prior Publication Data

US 2011/0223329 A1    Sep. 15, 2011

Related U.S. Application Data

(63) Continuation of application No. 10/579,654, filed as application No. PCT/AU2004/001622 on Nov. 22, 2004, now Pat. No. 7,919,145.

(30) Foreign Application Priority Data

Nov. 21, 2003   (AU) .................. 2003906427

(51) Int. Cl.
    *B05D 3/10*   (2006.01)
(52) U.S. Cl.
    USPC .......... 427/335; 427/226; 427/337; 427/340; 427/387
(58) Field of Classification Search
    USPC ............. 427/226, 337, 384, 387, 385.5, 273, 427/287, 340, 341, 343, 344; 428/209, 210, 428/446, 901
    See application file for complete search history.

(56) References Cited

U.S. PATENT DOCUMENTS

| | | | |
|---|---|---|---|
| 3,615,272 A * | 10/1971 | Collins et al. ................. | 423/325 |
| 3,922,392 A | 11/1975 | Kohlschutter et al. | |
| 5,639,517 A | 6/1997 | Floch et al. | |
| 5,698,266 A * | 12/1997 | Floch et al. ................ | 427/376.2 |
| 6,099,911 A | 8/2000 | Yano et al. | |
| 6,177,014 B1 * | 1/2001 | Potter et al. ................... | 210/651 |
| 6,231,989 B1 * | 5/2001 | Chung et al. .................. | 428/447 |
| 6,291,697 B1 | 9/2001 | Tanaka et al. | |
| 6,316,572 B1 * | 11/2001 | Nambu et al. ................... | 528/33 |
| 6,403,183 B1 | 6/2002 | Iwamiya et al. | |
| 6,511,721 B1 | 1/2003 | Murata et al. | |

(Continued)

FOREIGN PATENT DOCUMENTS

| EP | 834488 A | 4/1998 |
|---|---|---|
| EP | 1074859 A | 2/2001 |

(Continued)

OTHER PUBLICATIONS

ColCoat Co. Ltd. fact sheet printed from the website of said company.

(Continued)

*Primary Examiner* — Alexander Weddle

(57) ABSTRACT

A method of producing a film coated onto a substrate by dissolving a metal or metalloid containing compound having hydrolysable groups in a solvent to form a precursor solution. The precursor solution is coated onto the substrate as a continuous liquid phase. The precursor solution is then cured to produce a continuous, interconnected, nano-porous network.

13 Claims, 6 Drawing Sheets

(56) References Cited

U.S. PATENT DOCUMENTS

| | | |
|---|---|---|
| 6,599,976 B2 | 7/2003 | Kobayashi et al. |
| 6,610,145 B2 | 8/2003 | Hendricks et al. |
| 2002/0041932 A1 | 4/2002 | Ogawa |
| 2004/0028915 A1 | 2/2004 | Shibuya et al. |
| 2004/0048960 A1 | 3/2004 | Peterson et al. |

FOREIGN PATENT DOCUMENTS

| | | |
|---|---|---|
| JP | 04-180977 | 6/1992 |
| JP | 08-120225 | 5/1996 |
| JP | 10-226767 | 8/1998 |
| JP | 10-316934 | 12/1998 |
| JP | 2001028368 A * | 1/2001 |
| JP | A-2001-28368 | 1/2001 |
| WO | WO 94/23315 | 10/1994 |

OTHER PUBLICATIONS

Ishino et al., "Mass production of hydrophobic silica aerogel and readout optics of Cherenkov light", Nuclear Instruments and Methods in Physics Research A 457 (2001) pp. 581-587.

\* cited by examiner

FILMS AND METHOD OF PRODUCTION THEREOF

CROSS-REFERENCE TO RELATED APPLICATIONS

This application is a continuation-in-part of U.S. patent application Ser. No. 10/579,654 filed on May 18, 2006, now U.S. Pat. No. 7,919,145, which is a National Stage of International Application No. PCT/AU2004/001622, filed Nov. 22, 2004 which claims the benefit and priority of Australian Serial No. 2003-906427, filed Nov. 21, 2003, The entire disclosure of the above applications is incorporated herein by reference.

FIELD

This subject matter described herein relates to films formed from a metal or metalloid containing compound having hydrolysable groups and the use of such films as anti-reflective and/or anti-fogging and/or protective coatings.

BACKGROUND

This section provides background information related to the present disclosure which is not necessarily prior art.

Typically, low refractive index thin films are made utilizing sol-gel processes or vacuum evaporation deposition techniques. The following prior art documents are but a few examples of methods used to produce low refractive index films made from silica.

WO 02/41043 is directed to a method of forming a mesostructured inorganic/block copolymer composite or inorganic porous solid doped with a dye or dye sensitive agents, formed by creating a silica sol-gel from tetraethoxysilane (TEOS), ethanol and water. The sol-gel is then templated with block copolymers, such as poly(ethylene oxide)-poly(alkyene oxide)-poly(ethylene oxide). The inorganic/organic composite is then calcined or subjected to solvent extraction to remove excess block copolymer species, prior to doping with dye/dye sensitive agents.

U.S. Pat. No. 6,379,776 is directed to a multi-layer, anti-fogging and stain preventing glass coating comprising an alkaline shut-off film, a silica oxide/zirconium oxide composite, and a photocatalytic film of titanium oxide. Both the silica oxide/zirconium oxide composite layer and the titanium oxide layers are formed using known sol-gel processes.

US 2002/0090519 describes a method of hydrolytically polycondensing tetraalkoxysilanes to form a silica oxide sol. The hydrolytic polycondensation occurs by placing the tetraalkoxysilane in an aqueous alcohol ammoniacal solution to encourage hydrolysis of the tetraalkoxysilane and produce silica oxide particles. The sol is subject to steam distillation in order to remove the alcohol and ammonia prior to the pH being adjusted to between 3 and 8. Surfactants are then added to the silica sol to act as pore templates during the coating of a substrate. The coating is calcined to cure the silica film and remove the surfactants.

U.S. Pat. No. 5,948,482 is directed to a method of forming an aerogel thin film at ambient pressure, by forming a silica oxide sol-gel using standard processes before derivatizing the surface of the gel with a hydrolysable organic substituent, reliquefying the sol with sonication and depositing the gel onto a substrate.

U.S. Pat. No. 5,698,266 is directed to a modification of the standard sol-gel method of forming an anti-reflective coating by mixing ethanol, tetraethoxysilane (TEOS) and ammonia and hydrolysing for up to 48 hours to form a colloidal silicon oxide suspension dispersed in an aliphatic alcohol. The silica sol is then filtered to obtain silica particles for deposition onto a substrate, prior to drying. The coated substrate is placed in an ammoniacal environment for up to twelve hours to form an anti-reflective coating. This final step is claimed to improve the binding between the silica particles, and so renders the film more robust.

C. Shelle et al, *J. Non-Cryst. Solids,* 218, pg 163, 1997, describes a method of producing anti-glare glass films using sol-gel coatings formed from methyltriethoxysilane, tetraethoxysilane and tin oxide. The sol-gel is aged at 0° C. prior to deposition onto a substrate and calcining at 500° C.

G. Wu, et al, *J. Non-Cryst. Solids,* 275, pg 169, 2000, describes a method of creating a sol-gel, in which tetraethoxysilane (TEOS) is catalyzed in a two step acid-base process. The TEOS is initially aged in an ammonia-ethanol solution, pH adjusted, refluxed and a second pH adjustment made. In preparing the films, Wu et al deposit the sol-gel onto a substrate and expose to an ammoniacal environment.

Hass D. D. et al, NASA Contractor Report, 201733, teaches the coating of fibrous insulation with a reflective film such as silica, titanium dioxide, zirconium oxide and/or combinations thereof. The oxides are formed using known sol-gel processes into which the fibrous insulation is submersed to coat the fibers prior to vacuum or heat drying.

The above processes which rely on sol-gel techniques for producing thin films are complex, multi-step processes which are costly, involve high temperature steps in fabrication, and/or require a surfactant for templating. The films produced by these sol-gel processes are typically easy to damage and/or liable to delamination.

One of the few prior art processes for producing silica coatings without directly following the conventional sol-gel process is described in U.S. Pat. No. 6,231,989 assigned to Dow Corning Corporation. The '989 patent describes a process of forming a coating from a solution comprising a resin containing at least two Si—H groups in a solvent, such as methylisobutylketone. The solution is coated to a substrate with about 5% of the solvent remaining in the coating. An aqueous basic catalyst causes condensation of the Si—H groups. The solvent is evaporated to leave a porous coating. In summary, the method uses an ammonia vapor step to improve adhesion and mechanical strength of the resultant film, but relies in the main part upon conventional sol-gel methods to produce the coating at room temperature and pressure. The preparation of suitable starting materials containing two Si—H groups is difficult, which limits the usefulness of the technique.

SUMMARY

This section provides a general summary of the disclosure, and is not a comprehensive disclosure of its full scope or all of its features.

In a first aspect, although it need not be the only, or indeed the broadest form, the present disclosure includes a method of forming a film coated on a substrate including the steps of producing a precursor solution by dissolving a film precursor compound in a solvent, the film precursor compound comprising at least two hydrolysable groups bonded to a metal or metalloid; coating a substrate with the precursor solution; and curing the precursor solution onto the substrate.

Preferably, the film precursor compound is a metal alkoxide or metalloid alkoxide.

In a preferred embodiment, the metal or metalloid alkoxide is an oligomer.

In one embodiment, the metal or metalloid is selected from the group consisting of silicon, germanium, tin, lead, titanium, zirconium, hafnium, vanadium, niobium, tantalum, chromium, molybdenum, tungsten, yttrium, magnesium, calcium, strontium, barium, lead, zinc, cadmium, mercury, boron, aluminum, gallium, indium, and combinations thereof. Combinations may occur wherein multiple metals or metalloids are present either as primary ingredients or wherein one or more of the metals or metalloids are present in small quantities e.g. as a dopant.

In one particularly preferred embodiment, the film precursor compound is an oligomeric organosilicate.

The oligomeric organosilicate may have a number n of repeating units between 2 to 10, preferably between 3 to 8, more preferably between 4 to 6.

Suitably, the solvent may be selected from the group consisting of alcohols including polyols, ketones, amides and esters. Preferably, the solvent is an alcohol.

The coating step is preferably carried out by spin coating, dip coating, spray coating, fog coating, meniscus coating, slot coating, screen printing, roll coating or curtain coating.

Preferably, the precursor solution is cured onto the substrate in a gaseous environment having a non-neutral pH.

The gaseous environment will be a closed environment to substantially prevent gaseous exchange with the external environment.

Preferably, the gaseous environment is a basic environment comprising a volatile base, water and a solvent.

In a preferred embodiment, the basic environment comprises ammonia and an alcohol.

The precursor solution is preferably formed at or near neutral pH, that is the pH may be between 5 to 9, preferably 6 to 8 and more preferably, about 7. Maintaining a neutral pH assists in preventing the formation of sol particles in the precursor solution which is a feature of the present process.

It will be appreciated that the precursor solution is substantially free of solid material during the coating step (before curing), that is, the formation of a sol or colloid is deliberately avoided, and preferably at a selected pH such that the hydrolysis and/or condensation reactions are occurring at a minimal rate or are completely retarded, so the method does not follow the conventional sol-gel process described in the prior art. It will be further appreciated that the curing environment is responsible for controlling the rates of hydrolysis and polycondensation in the post-deposited film, to create a nanoporous, stable, highly cross-linked silica network wherein physical connection within the silica solid-phase is facilitated as a natural part of the polycondensation process in a manner which may be described as chemical sintering.

The method may further include the steps of controlling the solvent content of the precursor and/or controlling the solvent content in the curing environment, to control characteristics of the film.

Suitably the pore size may be related to the size of the precursor solution solvent molecule. The solvent content in the precursor solution relates to the pore density which may also be related to the solvent content in the ammoniacal environment. Further, surface roughness and other morphological features may be tailored by selection of solvents in the precursor solution and the curing environment. Further, surface roughness, particle size, pore size and volume and other morphological features may be tailored by selection of solvents in the precursor solution and the curing environment. Further still, these aspects may additionally be controlled by the addition of a small quantity of an agent capable of nucleating particle growth.

The method is suitably carried out at or near room temperature and atmospheric pressure.

The method may further include the step of exposing the formed film, after curing, to a heat treatment and/or a dry steam treatment at a temperature of about 100° C. to 110° C. Preferably, the dry steam comprises a small amount of ammonia or other pH modifier therein. It has been found that such a hydrothermal treatment provides for a stronger film.

In a further form, the present disclosure includes a precursor solution comprising about 1 part oligomeric organosilicate; about 0.2-100 parts alcohol; and about 0.01-1 part water.

In a still further form the present disclosure includes a silica or silica-like film having a refractive index between 1.1 and 1.56 and a film thickness less than 100 microns formed by a method including the steps of producing a precursor solution having a water content of no more than 20% by volume by dissolving an oligomeric organosilicate in a solvent; coating a substrate with the precursor solution; and curing the precursor solution onto the substrate in an ammoniacal environment.

In yet another form the present disclosure provides for the use of the silica or silica-like film coated on a transparent substrate to provide an anti-reflective and/or anti-fogging and/or protective coating.

In a yet further form of the present disclosure the oligomeric organosilicate is not silicic acid tetramethyl ester homopolymer.

Throughout the specification the term "low refractive index" is intended to refer to a silica film in accordance with the present disclosure having a refractive index less than silica glass in the wavelength range 200 nm to 20 μm.

In this specification, the terms "comprises", "comprising" or similar terms are intended to mean a non-exclusive inclusion, such that a product, composition, method, system or apparatus that comprises a list of elements does not include those elements solely, but may well include other elements not listed. Method steps, processes, and operations described herein are not to be construed as necessarily requiring their performance in the particular order discussed or illustrated, unless specifically identified as an order of performance. It is also to be understood that additional or alternative steps may be employed.

Examples are provided so that this disclosure will be thorough, and will fully convey the scope to those who are skilled in the art. Numerous specific details are set forth such as examples of specific compositions and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies may not be described in detail.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
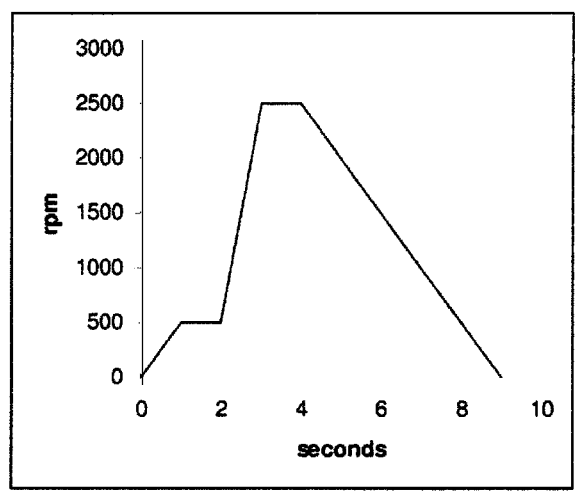
FIG. 1 is a spin profile for coating a substrate.

Example embodiments will now be described more fully with reference to the accompanying drawings.

The present disclosure provides for stable continuous films with controlled porosity and a highly cross-linked network. The method of forming the films begins with the formation of a precursor solution, via dissolution of a film precursor compound in a solvent, which is then coated onto a substrate prior to curing in a gaseous environment. This is a key difference between the present method and that of prior art sol-gel approaches which initiate hydrolysis reactions of, typically, a metal alkoxide to form particles and generate a colloidal suspension or sol prior to deposition on the substrate.

The method described herein deliberately avoids the formation of particles in suspension and instead uses a gaseous curing environment to adjust the pH of the solution post-deposition and thus to drive both hydrolysis and condensation reactions in the liquid precursor solution coated onto the substrate, causing micro phase separation of the deposited solution in-situ. This phase separation results in self assembly of the system into a porous solid and the growth of particles in the continuous phase constitutes a chemical sintering process. Thus it is the phase separation, occurring only in the curing step, which will assemble and template the film's final porosity. This approach can be controlled because of the aforementioned nucleation, growth and chemical sintering of the particles from the continuous phase and thereby provides distinct advantages, in the formed films, over the sol-gel approach.

The method of the present disclosure cannot proceed effectively if a substantial amount of hydrolysis occurs in the precursor solution prior to curing as this interferes with the phase separation and templating mechanisms as well as solubility, surface tension, viscosity, wetting and other key parameters required for formation of a continuous film. Significant hydrolysis in the precursor solution would also interfere negatively with the high degree of morphology control provided by the present disclosure and would prevent the system forming a porosity gradient from substrate to surface as well as potentially leading to a weaker attachment to the substrate, similar to that obtained with a typical sol-gel approach.

Finally, uncontrolled hydrolysis in the precursor solution would also increase stress within the film which the present process avoids by having the hydrolysis and condensation occur in situ, rather than placing ready formed solid/colloidal material into a system which then shrinks as the solvent is removed.

By a 'precursor solution' it is intended that said solution will not contain any substantial or significant amount of solid particles in suspension and thus is clearly differentiated from a colloidal suspension or sol. The presence of such particles may be measured by use of a diffractometer or similar particle detection methodology.

The film precursor compound may be chosen from a wide range of metals or metalloids selected from the periodic table groups 1, 2, 3, 4, 5, 6, 7, 8, 9, 10, 11, 12, 13 or 14 and having hydrolysable groups attached thereto. The metal or metalloid may be selected from silicon, germanium, tin, lead, titanium, zirconium, hafnium, vanadium, niobium, tantalum, chromium, molybdenum, tungsten, yttrium, magnesium, calcium, strontium, barium, lead, zinc, cadmium, mercury, boron, aluminum, gallium, indium, and combinations thereof. Silicates, aluminates, titanates, and borates are particularly preferred examples of film precursor compound.

In a preferred embodiment, the metal or metalloid has at least some hydrolysable alkoxy groups attached.

The film precursor compound may be a monomer or an oligomer. Commonly used monomers in the sol-gel process may also be suitable for use in the present method such as alkoxysilanes, including tetramethoxysilane (TMOS) and tetraethoxysilane (TEOS). However, it is particularly preferred that the film precursor compound is an oligomer such as, for example, an oligomeric organosilicate. The oligomeric film precursor compound may have a number 'n' of repeating units between 2 to 10, preferably between 3 to 8, more preferably between 4 to 6.

When the film precursor compound is an oligomeric organosilicate it may be obtained from a commercial supplier such as ColCoat Co Ltd of Japan or Gelest, Inc. Suitable products include a range of methyl silicates (such as MS51 wherein n is 4 to 5), ethyl silicates (ES28, ES40 and ES48 from Colcoat Co Ltd or PSI-021 from Gelest, Inc. wherein n is 4 to 6), N-propyl silicate and N-butyl silicate. Alternately the oligomeric organosilicate may be prepared by partial hydrolysis of organosilicate monomers (such as tetramethyl orthosilicate, tetraethyl orthosilicate, tetrapropyl orthosilicate, tetrabutyl orthosilicate, or mixed orthosilicates such as dimethoxydiethoxy orthosilicate).

These commercial products typically contain a distribution of molecular weights of the oligomeric organosilicate as well as a small proportion of related monomers in a solvent such as methanol or ethanol. The terms methyl silicate, ethyl silicate etc are occasionally used in the trade to refer to the monomeric species i.e. tetramethyl orthosilicate and tetraethyl orthosilicate. However, herein these terms are employed to describe the oligomeric species, in keeping with the naming convention for the commercial products. For clarity and by way of example, it will be understood by a person of skill in the art that methyl silicate may be referred to as silicic acid tetramethyl ester homopolymer or poly(dimethoxysiloxane) and ethyl silicate may be referred to as silicic acid tetraethyl ester homopolymer or poly(diethoxysiloxane) etc.

The oligomeric organosilicate is suitably of the general formula $X_1[(X_2)(X_3)SiO]_n X_4$. Each X group is not particularly restricted except that at least two of the groups are hydrolysable. Preferably, three of the four X groups are hydrolysable and, more preferably, all the X groups are hydrolysable. The inventors have found that each X may be different but is preferably an organic group and most preferably $C_1$-$C_{10}$ alkoxy substituted or unsubstituted, aryloxy substituted or unsubstituted, $C_1$-$C_{10}$ alkyl substituted or unsubstituted or aryl substituted or unsubstituted. Preferably, the alkoxy and alkyl groups referred to are $C_1$-$C_4$ groups.

A person of skill in the art would be aware of the wide range of metal or metalloid containing compounds which have been employed in the sol-gel process and which, thus, may be candidates for use in the present inventive method. By way of non-limiting example only, when the film precursor compound is a silicate it may comprise one or more of: methyltrimethoxysilane, methyltriethoxysilane, methyltri-n-propoxysilane, methyltri-iso-propoxysilane, methyltri-n-butoxysilane, methyltri-sec-butoxysilane, methyltri-tert-butoxysilane, methyltriphenoxysilane, ethyltrimethoxysilane, ethyltriethoxysilane, ethyltri-n-propoxysilane, ethyltri-iso-propoxysilane, ethyltri-n-butoxysilane, ethyltri-sec-butoxysilane, ethyltri-tert-butoxysilane, ethyltriphenoxysilane, n-propyltrimethoxysilane, n-propyltriethoxysilane, n-propyltri-n-propoxysilane, n-propyltri-iso-propoxysilane, n-propyltin-n-butoxysilane, n-propyltri-sec-butoxysilane, n-propyltri-tert-butoxysilane, n-propyltriphenoxysilane, isopropyltrimethoxysilane, isopropyltriethoxysilane, isopropyltri-n-propoxysilane, isopropyltriisopropoxysilane, isopropyltri-n-butoxysilane, isopropyltri-sec-butoxysilane, isopropyltri-tert-butoxysilane, isopropyltriphenoxysilane, n-butyltrimethoxysilane, n-butyltriethoxysilane, n-butyltri-n-propoxysilane, n-butyltriisopropoxysilane, n-butyltri-n-butoxysilane, n-butyltri-sec-butoxysilane, n-butyltri-tert-butoxysilane, n-butyltriphenoxysilane; sec-butyltrimethoxysilane, sec-butyltriethoxysilane, sec-butyltri-n-propoxysilane, sec-butyltriisopropoxysilane, sec-butyltri-n-butoxysilane, sec-butyltri-sec-butoxysilane, sec-butyltri-tert-butoxysilane, sec-butyltriphenoxysilane, tert-butyltrimethoxysilane, tert-butyltriethoxysilane, tert-butyltri-n-propoxysilane, tert-butyltriisopropoxysilane, tert-butyltri-n-butoxysilane, tert-butyltri-sec-butoxysilane, tert-butyltri-tert-butoxysilane, tert-butyltriphenoxysilane, isobutyltrimethoxysilane, isobutyltriethoxysilane, isobutyltri-n-propoxysilane, isobutyltriisopropoxysilane, isobutyltri-n-butoxysilane, isobutyltri-sec-butoxysilane, isobutyltri-tert-butoxysilane, isobutyltriphenoxysilane, n-pentyltrimethoxysilane, n-pentyltriethoxysilane, n-pentyltri-n-propoxysilane, n-pentyltriisopropoxysilane, n-pentyltri-n-butoxysilane, n-pentyltri-sec-butoxysilane, n-pentyltri-tert-butoxysilane, n-pentyltriphenoxysilane; sec-pentyltrimethoxysilane, sec-pentyltriethoxysilane, sec-pentyltri-n-propoxysilane, sec-pentyltriisopropoxysilane, sec-pentyltri-n-butoxysilane, sec-pentyltri-sec-butoxysilane, sec-pentyltri-tert-butoxysilane, sec-pentyltriphenoxysilane, tert-pentyltrimethoxysilane, tert-pentyltriethoxysilane, tert-pentyltri-n-propoxysilane, tert-pentyltriisopropoxysilane, tert-pentyltri-n-butoxysilane, tert-pentyltri-sec-butoxysilane, tert-pentyltri-tert-butoxysilane, tert-pentyltriphenoxysilane, isopentyltrimethoxysilane, isopentyltriethoxysilane, isopentyltri-n-propoxysilane, isopentyltriisopropoxysilane, isopentyltri-n-butoxysilane, isopentyltri-sec-butoxysilane, isopentyltri-tert-butoxysilane, isopentyltriphenoxysilane, neo-pentyltrimethoxysilane, neo-pentyltriethoxysilane, neo-pentyltri-n-propoxysilane, neo-pentyltriisopropoxysilane, neo-pentyltri-n-butoxysilane, neo-pentyltri-sec-butoxysilane, neo-pentyltri-neo-butoxysilane, neo-pentyltriphenoxysilane phenyltrimethoxysilane, phenyltriethoxysilane, phenyltri-n-propoxysilane, phenyltriisopropoxysilane, phenyltri-n-butoxysilane, phenyltri-sec-butoxysilane, phenyltri-tert-butoxysilane, phenyltriphenoxysilane, dimethyldimethoxysilane, dimethyldiethoxysilane, dimethyldi-n-propoxysilane, dimethyldiisopropoxysilane, dimethyldi-n-butoxysilane, dimethyldi-sec-butoxysilane, dimethyldi-tert-butoxysilane, dimethyldiphenoxysilane, diethyldimethoxysilane, diethyldiethoxysilane, diethyldi-n-propoxysilane, diethyldiisopropoxysilane, diethyldi-n-butoxysilane, diethyldi-sec-butoxysilane, diethyldi-tert-butoxysilane, diethyldiphenoxysilane, di-n-propyldimethoxysilane, di-n-propyldimethoxysilane, di-n-propyldi-n-propoxysilane, di-n-propyldiisopropoxysilane, di-n-propyldi-n-butoxysilane, di-n-propyldi-sec-butoxysilane, di-n-propyldi-tert-butoxysilane, di-n-propyldiphenoxysilane, diisopropyldimethoxysilane, diisopropyldiethoxysilane, diisopropyldi-n-propoxysilane, diisopropyldiisopropoxysilane, diisopropyldi-n-butoxysilane, diisopropyldi-sec-butoxysilane, diisopropyldi-tert-butoxysilane, diisopropyldiphenoxysilane, di-n-butyldimethoxysilane, di-n-butyldiethoxysilane, di-n-butyldi-n-propoxysilane, di-n-butyldiisopropoxysilane, di-n-butyldi-n-butoxysilane, di-n-butyldi-sec-butoxysilane, di-n-butyldi-tert-butoxysilane, di-n-butyldiphenoxysilane, di-sec-butyldimethoxysilane, di-sec-butyldiethoxysilane, di-sec-butyldi-n-propoxysilane, di-sec-butyldiisopropoxysilane, di-sec-butyldi-n-butoxysilane, di-sec-butyldi-sec-butoxysilane, di-sec-butyldi-tert-butoxysilane, di-sec-butyldiphenoxysilane, di-tert-butyldimethoxysilane, di-tert-butyldiethoxysilane, di-tert-butyldi-n-propoxysilane, di-tert-butyldiisopropoxysilane, di-tert-butyldi-n-butoxysilane, di-tert-butyldi-sec-butoxysilane, di-tert-butyldi-tert-butoxysilane, di-tert-butyldiphenoxysilane, diphenyldimethoxysilane, diphenyldiethoxysilane, diphenyldi-n-propoxysilane, diphenyldiisopropoxysilane, diphenyldi-n-butoxysilane, diphenyldi-sec-butoxysilane, diphenyldi-tert-butoxysilane, diphenyldiphenoxysilane, methylneopentyldimethoxysilane, methylneopentyldiethoxysilane, methyldimethoxysilane, ethyldimethoxysilane, n-propyldimethoxysilane, isopropyldimethoxysilane, n-butyldimethoxysilane, sec-butyldimethoxysilane, tert-butyldimethoxysilane, isobutyldimethoxysilane, n-pentyldimethoxysilane, sec-pentyldimethoxysilane, tert-pentyldimethoxysilane, isopentyldimethoxysilane, neopentyldimethoxysilane, neohexyldimethoxysilane, cyclohexyldimethoxysilane, phenyldimethoxysilane, methyldiethoxysilane, ethyldiethoxysilane, n-propyldiethoxysilane, isopropyldiethoxysilane, n-butyldiethoxysilane, sec-butyldiethoxysilane, tert-butyldiethoxysilane, isobutyldiethoxysilane, n-pentyldiethoxysilane, sec-pentyldiethoxysilane, tert-pentyldiethoxysilane, isopentyldiethoxysilane, neopentyldiethoxysilane, neohexyldiethoxysilane, cyclohexyldiethoxysilane-, phenyldiethoxysilane, trimethoxysilane, triethoxysilane, tri-n-propoxysilane, triisopropoxysilane, tri-n-butoxysilane, tri-sec-butoxysilane, tri-tert-butoxysilane, triphenoxysilane. Of the above compounds, the preferred compounds are methyltrimethoxysilane, methyltriethoxysilane, methyltri-n-propoxysilane, methyltriisopropoxysilane, ethyltrimethoxysilane, ethyltriethoxysilane, dimethyldimethoxysilane, dimethyldiethoxysilane, diethyldimethoxysilane, and diethyldiethoxysilane.

As an alternative to the purchase of commercially available oligomers, the oligomeric film forming compound may be formed from one or more monomers. By way of example, the oligomer can be formed from the monomer by partial hydrolysis, as depicted in the following reactions:

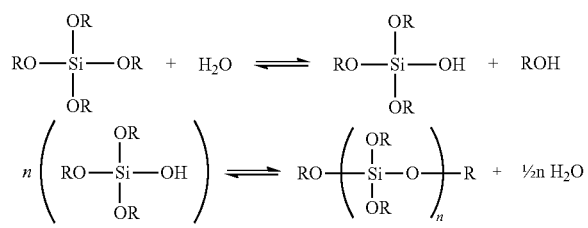

This requires very careful control of the process, including the amount and rate of water addition, to ensure that the hydrolysis is limited to oligomer formation and does not result in formation of a sol, in particular the creation of solid particles.

Discussion herein will centre on the use of oligomers, and in particular oligomeric silicates, as a preferred form of film precursor compound.

The precursor solution may be prepared by mixing the oligomeric organosilicate in a solvent. The precursor solution may comprise about 0.01-1 parts water and 0.2-100 parts solvent for each part of oligomeric organosilicate. An example ratio of reagents in the precursor solution is 1.0 part oligomeric organosilicate: 0.1 part water: 10 parts solvent.

The term 'solvent' as used herein may refer to any liquid which can solubilise the film precursor compound, is suitable for film deposition and is relatively easily removed after curing. The control of the rate of hydrolysis and condensation reactions, which are key facets of the present process, rely upon solvent being present prior to the curing phase. Suitable solvents may be polar solvents and certain aromatic solvents and include alcohols inclusive of polyols, ketones, amides, esters, DMSO, chlorobenzene, tetrahydrofuran, dichlorobenzene, toluene, DCM, ethers including diethyl ether, dibutyl ether and various of the benzene/toluene family. Preferred solvents include methanol, ethanol, n-propanol, iso-propyl alcohol, butanol, pentanol and acetone.

The precursor solution is then deposited onto a desired substrate, such as glass, before curing in a closed chamber filled with a gaseous curing environment. The gaseous curing environment will comprise a pH modifier such as an acid or a base or it may comprise a catalyst. This agent will increase the rate of or begin the hydrolysis/condensation reactions. In a preferred embodiment the gaseous curing environment will comprise ammonia which can act both as a catalyst and alkalinity increaser.

Suitable bases nonexclusively include ammonia and amines, such as primary, secondary and tertiary alkyl amines, aryl amines, alcohol amines and mixtures thereof which have a preferred boiling point of about 200° C. or less, more preferably 100° C. or less and most preferably 50° C. or less. Preferred amines are alcoholamines, alkylamines, methylamine, monoethanol amine, diethanol amine, triethanol amine, dimethylamine, trimethylamine, n-butylamine, n-propylamine, tetramethyl ammonium hydroxide, piperidine, 2-methoxyethylamine, mono-, di- or triethanolamines, and mono-, di-, or tri-isopropanolamines. Preferably, the base present in the curing environment is ammonia.

Suitable acids may be any organic or inorganic acid which is capable of providing a vapor at the process temperatures and include sulphuric acid, nitric acid and hydrochloric acid.

The method may further include the step of exposing the formed film, after curing, to a heat treatment and/or dry steam treatment at a temperature of above 100° C. to about 110° C. Preferably, the dry steam may comprise a small amount of ammonia therein. It has been found that such a hydrothermal treatment provides for a stronger film. Prior art sol-gel processes occasionally employ a heating step to improve film qualities but this will normally be at temperatures of approximately 600° C. and so the present method provides for a low energy alternative.

The present process provides for films with advantageous properties over those prepared by a sol-gel process. For example, in relation to the formation of a silica film, the precursor solution will be coated onto the substrate, e.g. glass, without any substantial degree of hydrolysis having occurred. The coating is then exposed to the catalyst (ammonia) and water vapor. The glass surface will already have available potentially reactive silanol groups and the ammonia is believed to remove a hydrogen from this group to thereby create a suitably reactive moiety. While this is happening the organosilicate in the precursor solution is being hydrolysed and so the glass surface and the organosilicate are made more reactive at the same time ensuring fast and plentiful reaction between the two to form strong covalent bonds. This provides for a very strong adherence between film and glass which is not achieved via a sol-gel process where much of the silica source has already been hydrolysed and condensed, to some extent, prior to contact with the substrate.

The present films then effectively grow from the film/glass interface upwards. The alcohol present in either the precursor solution or the curing environment will form nanosized pockets within the growing interconnected porous network. This helps to support the film structure during its dynamic growth process. The film may form in a gradient whereby the bottom, closest to the glass, is more dense than the film surface due to the reactions discussed above with the glass surface forming a dense network in that area and contributing to the strength of adherence between film and substrate. The less dense region near the exposed surface of the film assists with the observed anti-fogging and other properties. It is further recognized that the density gradient created by this curing process leads to enhanced optical properties such as superior anti-reflection relative to a uniform density layer of equivalent average refractive index and thickness.

Example 1

Ethyl Silicate 40.

An exemplary process for producing a film is described below.

50 ml of ethyl-silicate-40 (comprising >94% silicic acid tetraethyl ester homopolymer, <4% tetraethoxysilane, <4% ethanol) {supplied by COLCOAT CO. LTD. 3-28-6 Omorinishi, Ota-ku, Tokoyo 143-0015, Japan} is dissolved in 100 ml of ethanol or methanol to form a precursor solution.

The precursor solution may comprise any alcohol that creates dispersed droplets throughout the precursor solution to facilitate the formation of pores in the final film.

The precursor solution is applied to a substrate, in this example a glass slide, by dip coating.

It will be appreciated that other deposition techniques such as spin coating and spraying may also be used to apply the precursor solution to a substrate. A typical spin coating profile is to ramp to 500 rpm in 1 sec, spin for 1 sec at 500 rpm, ramp to 2500 rpm in 1 sec, spin at 2500 rpm for 1 sec, ramp down at 500 rpm per sec for 5 sec, as shown in FIG. 1.

It may be appropriate for the coated substrate to sit in an alcohol atmosphere for a time to allow equilibrium to be established between the alcohol in the atmosphere and the alcohol content of the precursor solution on the substrate. As discussed below, the alcohol content in the precursor solution influences the porosity of the film The coated substrate is then placed in a closed container of approximately 30 liters volume containing a curing agent (20 ml aqueous ammonia 28% solution and 20 ml alcohol), which creates an appropriate ammoniacal atmosphere for the silica film to cure. The container is arranged in such a manner that the film is never in contact with the curing liquid. This is important due to the present method employing a purely liquid precursor solution with substantially no solid particle content which, if contacted with a liquid curing agent, would simply be washed away. This is in contrast to prior art approaches wherein the formation of a solid matrix prior to curing, due to extensive hydrolysis, allows the film to be in direct contact with the curing liquid. This curing step continues until the film solidifies and becomes mechanically robust.

Figure 2:
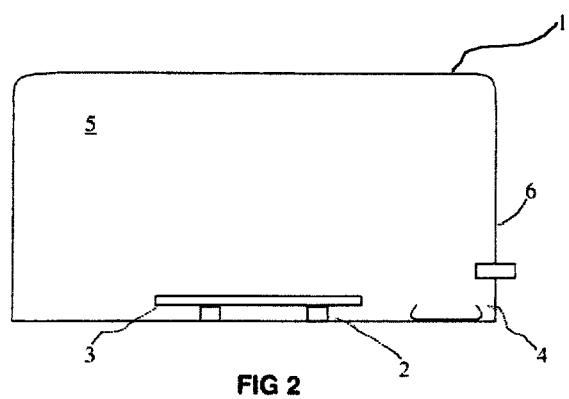
FIG. 2 is a schematic of a curing chamber.

A schematic of a curing chamber 1 is shown in FIG. 2. The chamber 1 is a closed system having some form of mount 2 in the base for receiving the substrate 3. A reservoir 4 is filled with a mixture of ammonia, alcohol and water which evaporates to produce an atmosphere 5 having a composition determined by the partial pressures of the ammonia, water and alcohol at the applicable temperature and pressure. A port 6 may be provided so that the mixture in the reservoir can be adjusted without opening the chamber.

It will be appreciated that any quantities of water, alcohol and ammonia/ammonium hydroxide may be used to create the ammoniacal atmosphere to cure the silica film. The curing chamber 1 may, prior to or during curing, have an amount of silica gel placed therein to control the humidity in the curing environment.

The porosity of the produced film is determined, at least in part, by the alcohol in the precursor solution prior to curing. The alcohol in the precursor solution is understood to produce pores in the film which remain after curing. The density of the pores is determined, at least in part, by the amount of alcohol present in the precursor solution during curing, whereas the size of the pores is determined by the type of alcohol. A large polyol produces a larger pore size than, say, methanol or ethanol.

During the curing stage the water in the ammoniacal atmosphere causes hydrolysis of the precursor solution. Equilibrium is established between the alcohol in the precursor solution and the alcohol in the ammoniacal atmosphere. This means that the final porosity of the film can be controlled by placing the coated substrate in an alcohol environment prior to introducing ammonia to the chamber to catalyze the silica cross-linking reaction.

The hydrolysis reaction equation during curing for the example of oligomeric tetraethoxysilane (R=$C_2H_5$) is:

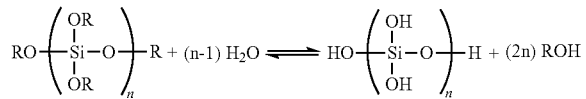

Example 2

Ethyltrimethoxysilane.

Monomeric ethyltrimethoxysilane (ETOS) {supplied by Sigma-Aldrich, Castle Hill, NSW Australia} was mixed with water in the molar ratio of 1 part ETOS to 0.2 parts water with sufficient ethanol added to dissolve the ETOS. This mixture is allowed to react and form a silica oligomer.

The precursor solution is formed by adding 10 ml ethanol or methanol to 10 ml of the silica oligomer.

The precursor solution is applied to a substrate, in this example a glass slide, by placing some drops of the precursor solution on the surface and allowing them to spread and flow under gravity.

The coated substrate is then placed in a closed container of approximately 30 liters volume containing a curing agent (20 ml aqueous ammonia 28% solution and 20 ml alcohol), which creates an appropriate ammoniacal atmosphere for the silica film to cure.

Example 3

Methyltrimethoxysilane.

Monomeric methyltrimethoxysilane (MTOS) {supplied by Sigma-Aldrich, Castle Hill, NSW Australia} is mixed with water in the molar ratios of 1 part MTOS to 0.3 parts water with sufficient ethanol added to dissolve the MTOS. This mixture is allowed to react and form a silica oligomer. Other ratios of 1 part MTOS to 0.2 parts or 0.4 parts water were also found to be suitable.

The precursor solution is formed by adding 10 ml ethanol or methanol to 10 ml of the silica oligomer. Other dilutions of 20 ml, 40 ml and 80 ml ethanol were also found to be suitable.

The coated substrate is then placed in a closed container of approximately 30 liters volume containing a curing agent (20 ml aqueous ammonia 28% solution and 20 ml alcohol), which creates an appropriate ammoniacal atmosphere for the silica film to cure.

It will be appreciated that the prior art processes, such as found in U.S. Pat. No. 5,698,266, produce films of weakly bonded nano-particles of silica whereas the process described above produces a continuous, interconnected, nano-porous silica network. Hence the film is stronger and the characteristics of the film (porosity and refractive index) can be controlled.

The films of the above examples, and films produced in a similar manner to these examples, were physically characterized. The results of the physical characterization are summarized below.

Optical Transparency. The optical transparency of the films was determined using a suitable spectrophotometer such as the PERKIN ELMER® LAMBDA 40 UV-Visible Spectrophotometer, having the following scan settings:

Slit width: 2nm, Scan speed: 240nm/min

Data interval: 1nm

An empty sample arm was used to determine the background spectra for correction purposes.

Figure 3:
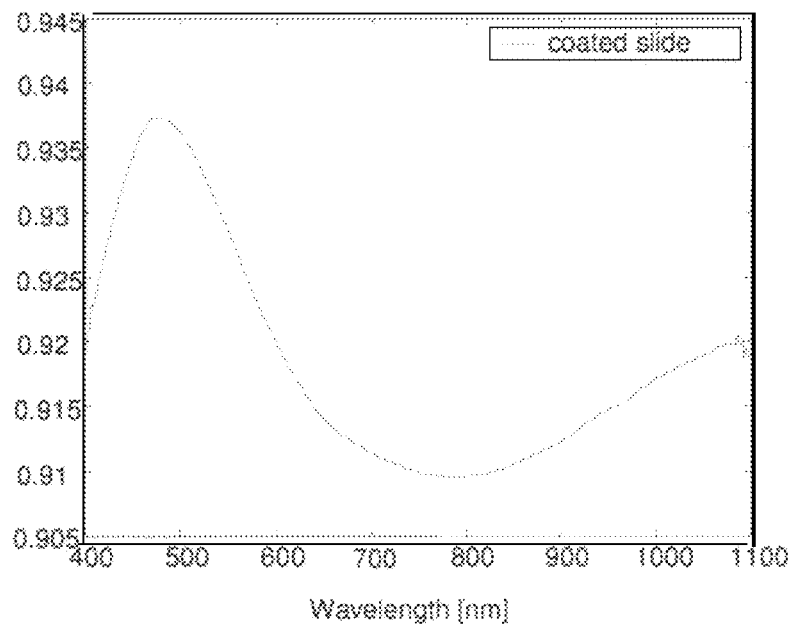
FIG. 3 is a graph of the UV-visible optical transmission spectrum of the film of Example 1.

The UV-Visible optical transmission spectrum was measured for a thin film (film thickness of less than 2 microns) similar to that formed in Example 1. The spectrum is shown in FIG. 3. The key feature of these spectra is the high optical transmission of the coated glass substrate over the entire visible spectrum. This observation may also be confirmed by simply looking at the coated glass substrate which appears transparent to the eye.

Figure 4:
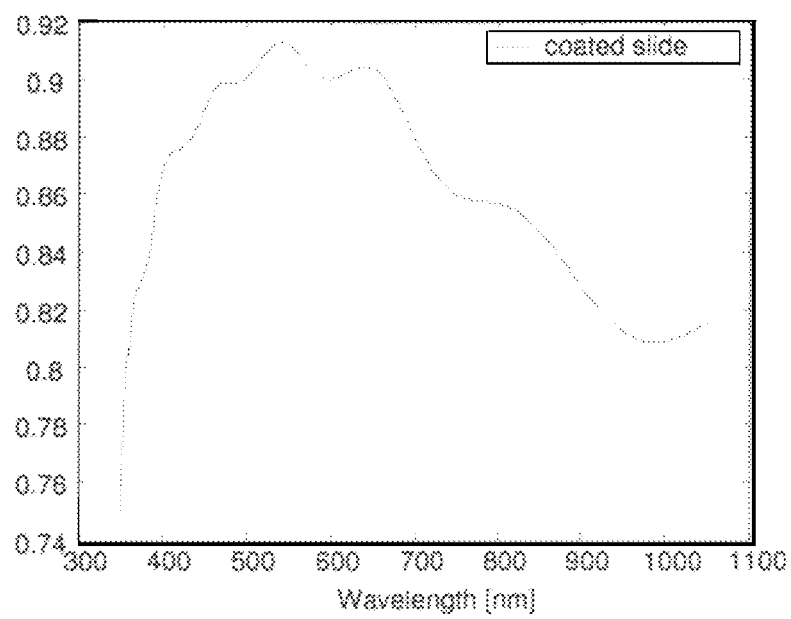
FIG. 4 is a graph of the UV-visible optical transmission spectra of a spin coated film of silica on glass produced by the method of the present disclosure.

FIG. 4 is a UV-Visible optical transmission spectra for a silica film, having a film thickness of approximately 4 microns, formed in a similar manner to that in Example 1. The film used for this test was thicker than that used in FIG. 3 evidenced by the interference fringes, peaks and troughs, as a function of wavelength. The fringe contrast is appreciable (~5%), indicating that the refractive index of the film is <1.3.

Figure 5:
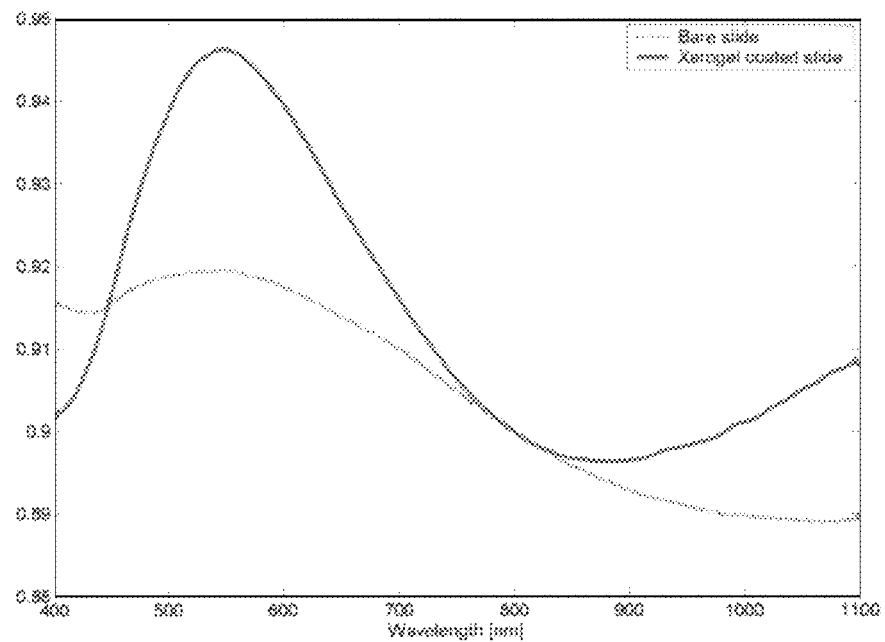
FIG. 5 is a UV-visible optical transmission spectra for an uncoated glass slide and a glass slide coated with an antireflective silica film formed by the method of the present disclosure.

By way of comparison, FIG. 5 shows a transmission spectrum of a film similar to that of FIG. 3 with the transmission spectrum of an uncoated glass slide. Ordinarily, ~4% of incident light is reflected from each glass-air interface, leading to a normal transmission of ~92% for an uncoated glass substrate. FIG. 5 shows the increase (~94.6%) in transmission that can be achieved by coating one side of a glass substrate with a low refractive index film produced by the new process. Theoretically, a thin film of refractive index ~1.22, and of an appropriate thickness, would be the perfect anti-reflective coating for glass, as it would have a 96% transmission for a single sided coating. This transmission value is very close to the experimental value indicating that the films of the present disclosure are effective anti-reflective coatings for glass.

Scratch Resistance. The hardness test or scratch resistance test was conducted by taking a set of pencils ranging in hardness from 2B (soft) to 7H (quite hard) and attempting to scratch the film's surface of Example 1. None of these pencils were able to scratch the material, leading to the conclusion that the material hardness is >7H on the pencil scale.

These hardness and scratch resistance results indicate that the films of the present disclosure are similar to glass and significantly better than vacuum coated dielectric low refractive index coatings.

Figure 6:
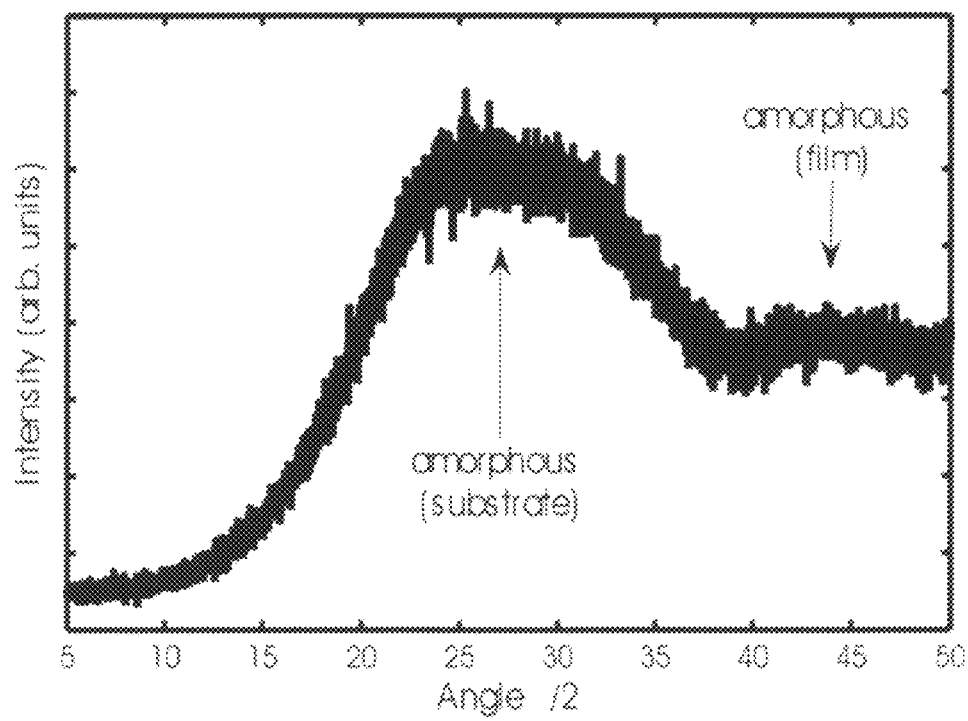
FIG. 6 is an x-ray diffraction image of a film on a glass substrate.

X-ray Diffraction. An x-ray diffraction scan of a glass slide coated with a film similar to Example 1 is shown in FIG. 6. The spike close to zero degrees is an artefact and the bulge is normal. This demonstrates that the film is amorphous and there is no appreciable crystallization occurring.

Solvent Resistance. The films were found to be resistant to washing with water, alcohols, common acids and alkalis.

Anti-fogging. The films formed by the method of Example 1 have been found to provide effective anti-fogging properties. The porosity or surface area of the silica films is approximately 150 m$^2$/g, using standard nitrogen adsorption-absorption techniques. It is believed that coatings having a minimum surface area of 10 m$^2$/g will exhibit anti-fogging properties.

It is believed that the anti-fogging properties of the films of the present disclosure are due to the hydrophilicity and high surface area of the films. It is thought that the high surface area and hydrophilicity of the films allows atmospheric water to be absorbed onto the film, thus preventing water droplets from forming.

Example 4

Water Doping.

It is preferred that no additional water is added to the precursor solution than would naturally be present in the solvent. However, to determine the upper limit of the water content which could be tolerated by the inventive process and still provide workable, if not optimal, films, several oligomeric silica precursors were evaluated in a standard anhydrous (Dry, <1% v/v H$_2$O) and a 15% v/v H$_2$O (Wet) preparation. The following oligomeric silica precursors were evaluated: MS-51 (poly[dimethoxysiloxane], {supplied by COLCOAT CO. LTD.}), ES-40 (poly[diethoxysiloxane], {supplied by COLCOAT CO. LTD.}), and PSI-021 (poly [diethoxysiloxane], {supplied by Gelest, Inc.}.

The Dry preparations had the film precursor measured volumetrically, then added to a volume of SDA- 3A alcohol 200 Proof (BBC Biochemical, 95% ethanol+5% methanol, <0.3% water) to create a desired concentration of precursor solution and stirred for 15 minutes in a covered polypropylene beaker before being used to coat a substrate. The Wet preparations followed the same procedure, but had 15% v/v RO water added to the solution after dissolving the silica film precursor in the alcohol.

All coating substrates were from a single batch of low iron float glass (300×300×4.0 mm) cut down to 100×100 mm squares, which were first hand rinsed with tap water to remove interleave residue, then washed and dried in a suitable washer such as a MIELE® washer using a standard glass wash program. Two 100×100×4.0 mm pieces were used for each coating formulation examined (i.e. 2 for the Dry and 2 for the Wet), and were dip coated simultaneously in the same container holding the coating precursor solution. The nominal withdrawal rate was 0.86 mm/s. Samples were allowed a 60 second "flash-off" period under still air prior to removal from the dip coater and being placed into a primed curing chamber.

Curing of the wet coatings was performed in a sealed desiccator box of 20 liter capacity, using 100 mL of ammonium hydroxide (28-30% w/w NH$_3$, ACS grade commercially available from SGMA-ALDRICH®) and 100 mL of HPLC grade methanol (commercially available from SIGMA-ALDRICH ®). Humidity control was provided by 90 grams of activated silica gel. The atmosphere was circulated by a 75 mm fan run at 12V. Curing times varied for the silica precursor, to account for the differences in hydrolysis rates and resultant curing times. The details of the formulations and curing times are reproduced in Table 1, below.

Figure 7:
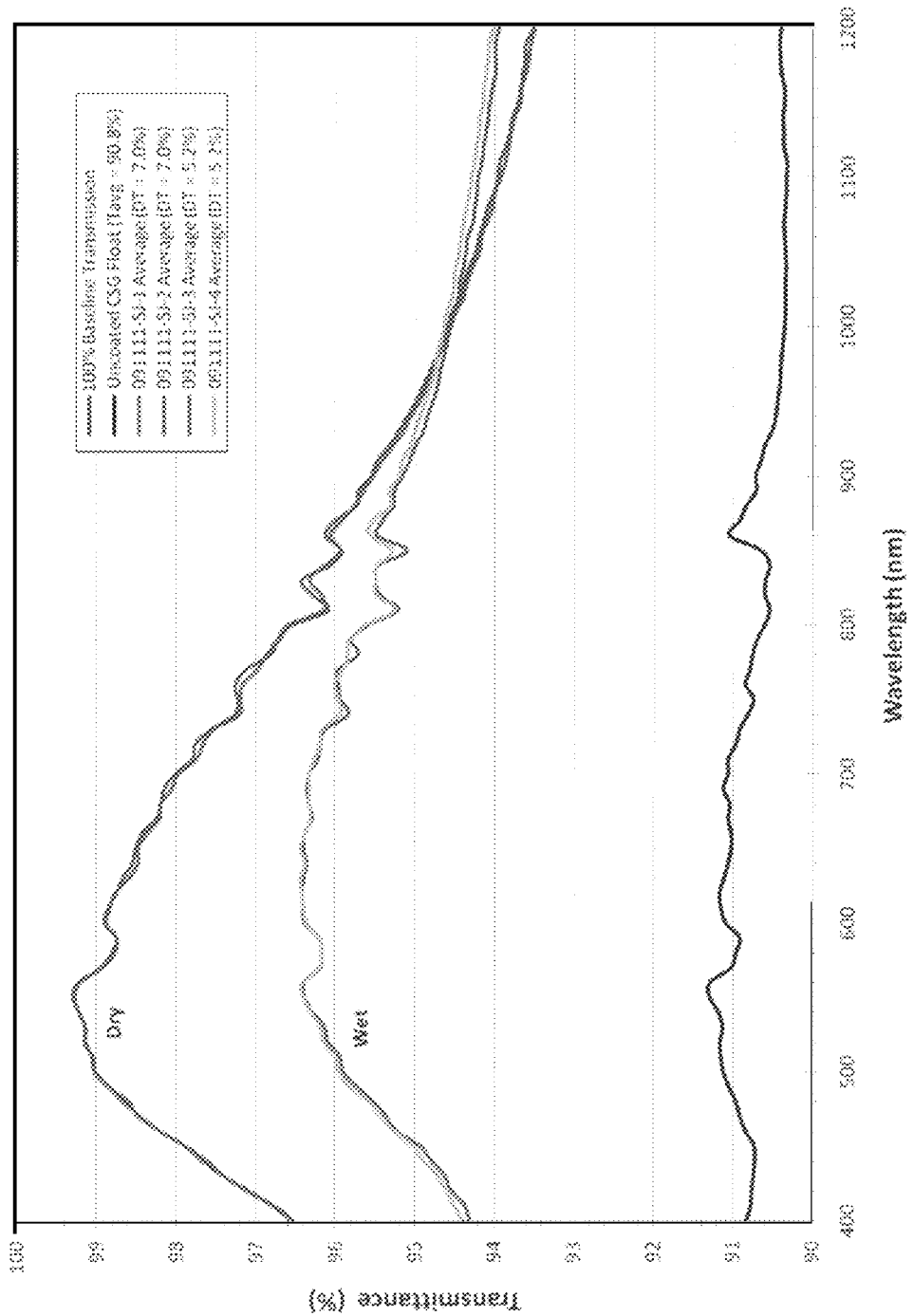
FIG. 7 is a transmittance spectra of coatings prepared from silicic acid tetramethyl ester homopolymer (supplied by ColCoat Co Ltd of Japan) with and without the addition of water.
Figure 8:
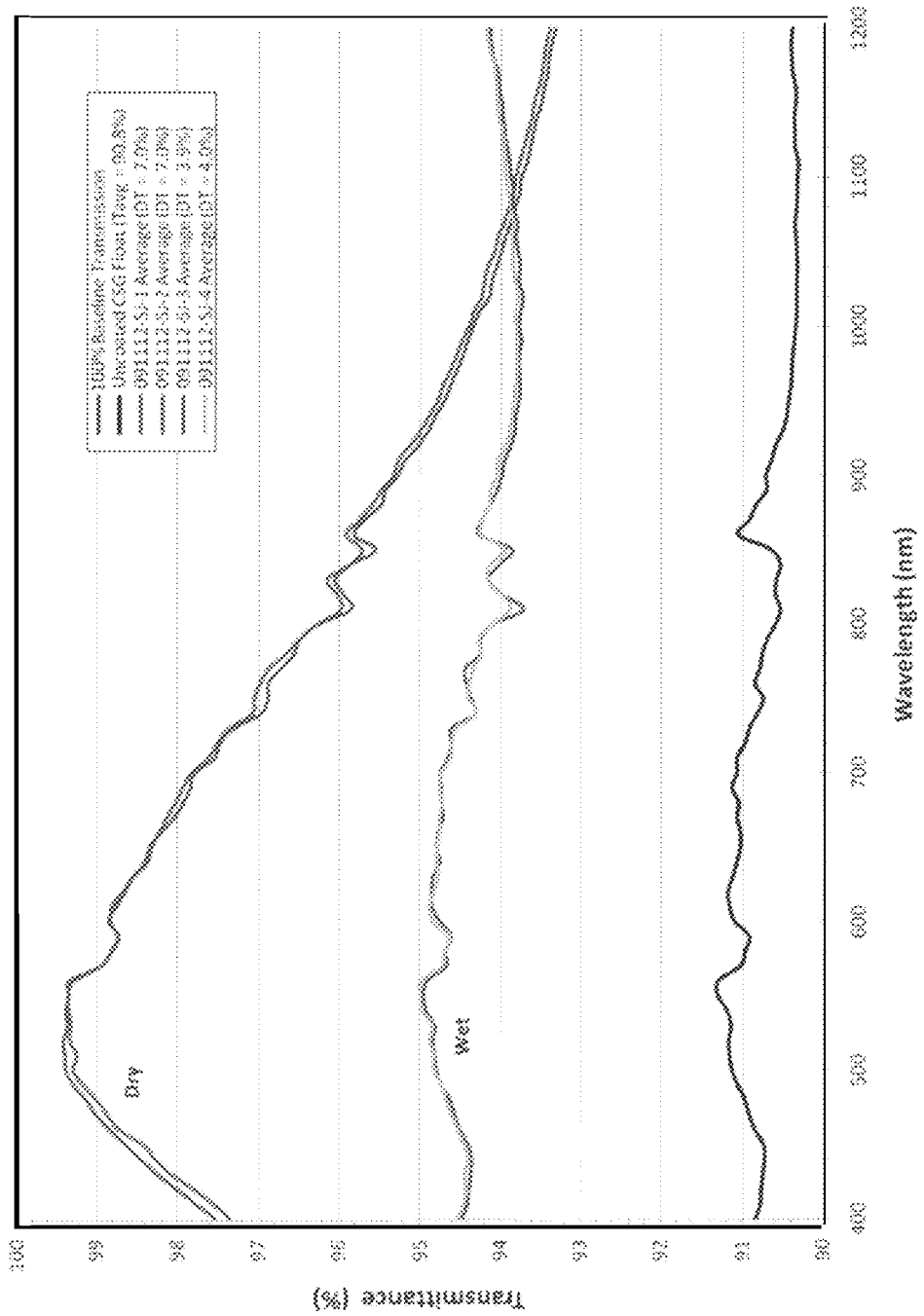
FIG. 8 is a transmittance spectra of coatings prepared from silicic acid tetraethyl ester homopolymer with and without the addition of water.
Figure 9:
FIG. 9 is a transmittance spectra of coatings prepared from silicic acid tetramethyl ester homopolymer (supplied by Gelest, Inc.) with and without the addition of water.

The oligomeric silica precursor solutions all formed continuous films with good anti-reflective properties when prepared in the standard Dry formulations. The Wet formulations using oligomeric silica precursors exhibited phase separation when the water was added, forming an emulsion that produced discontinuous coatings with extremely poor anti-reflective properties. The results are demonstrated graphically in FIG. 7 (for MS-51), FIG. 8 (for ES-40) and FIG. 9 (for PSI-021) wherein the upper lines represent duplicate results for the Dry solution and the lower two are duplicate results for the Wet solution.

In one general embodiment the precursor solution of the present method has a water content of less than about 20% by volume. A water content above this level will result in either a workable film not being formed or a film being produced with such poor anti-reflective properties as to be effectively useless. Preferably, the water content of the precursor solution is less than about 15%.

It will be appreciated that it is desirable to minimize the water content of the precursor solution and so, typically, no water is added. However, the above experiments show that, under the appropriate conditions of use, some water content may be tolerated to produce workable films so long as it is not a sufficient amount or is not left in the precursor solution for a sufficient time, to cause sol formation.

TABLE 1

Formulation, coating and curing data for Example 4.

| Formulation | Silica Precursor | Precursor (%) | SDA-3A Alcohol (%) | RO Water (%) | Curing Time (hrs) |
|---|---|---|---|---|---|
| MS-51 - Dry | MS-51 | 11.1 | 88.9 | 0 | 1 |
| MS-51 - Dry | MS-51 | 11.1 | 88.9 | 0 | 1 |
| MS-51 - Wet | MS-51 | 11.1 | 73.9 | 15 | 1 |
| MS-51 - Wet | MS-51 | 11.1 | 73.9 | 15 | 1 |
| ES-40 - Dry | ES-40 | 14.5 | 85.5 | 0 | 2 |
| ES-40 - Dry | ES-40 | 14.5 | 85.5 | 0 | 2 |
| ES-40 - Wet | ES-40 | 14.5 | 70.5 | 15 | 2 |

TABLE 1-continued

Formulation, coating and curing data for Example 4.

| Formulation | Silica Precursor | Precursor (%) | SDA-3A Alcohol (%) | RO Water (%) | Curing Time (hrs) |
|---|---|---|---|---|---|
| ES-40 - Wet | ES-40 | 14.5 | 70.5 | 15 | 2 |
| PSI-021 - Dry | PSI-021 | 14 | 86 | 0 | 2 |
| PSI-021 - Dry | PSI-021 | 14 | 86 | 0 | 2 |
| PSI-021 - Wet | PSI-021 | 14 | 71 | 15 | 2 |
| PSI-021 - Wet | PSI-021 | 14 | 71 | 15 | 2 |

The thin films produced by this method have been found to have a number of favorable characteristics, including: a low refractive index in the visible spectrum, typically 1.1 to 1.56; high optical transparency; high optical and thickness uniformity; mechanical robustness similar to glass; chemical and photochemical properties similar to glass; high porosity, leading to efficient anti-fogging behavior; excellent adhesion to conventional substrates, such as glasses, plastics, metals, ceramics, semiconductors, and the like; and durability/long term stability.

A number of features of the films of the present disclosure may be tailored or tunable to suit the final application of the film, for example: Tunable refractive index: the refractive index may be tuned according to need by adjusting the composition, in particular the alcohol and water content; and Tunable film thickness: the film thickness can be tuned by adjusting the initial alcohol and water contents in the precursor solution and, can also be adjusted by varying the parameters relating to the deposition method, such as spin speed, viscosity, dip coating withdrawal rate, and the like using standard methods for the chosen coating technique.

The viscosity of the precursor solution may be altered to facilitate its use in a range of applications, for example, a highly viscous formulation may be formed so that when sprayed onto a substrate to create a thin coverage of the precursor it does not flow significantly whilst curing.

The method of the present disclosure provides a low cost simple method for producing robust films with effective control over the thickness and refractive index of the coating, along with being able to coat a range of substrate materials and shapes.

The above properties make the films ideal candidates for cheap, robust, efficient optical coatings for applications including antireflection coatings, chemical and mechanical barrier coatings, anti-fogging coatings, anti-glare coatings (light diffusing effect), high reflectivity coatings, low refractive index supports and cladding and dielectric barrier layers.

The thin films of the present disclosure may be employed as low refractive index optical coatings for anti-reflection coatings or as low and high refractive index materials in high-low refractive index multilayer coatings. As a low refractive index optical coating the silica thin films may be applied to all forms of glass including spectacles, windows, windscreens, decorative, etc.; coatings for CRT and other display devices such as computer monitors, televisions, etc.; coatings for solar cells; optical instrument coatings such as lenses, mirrors, and the like; active and passive optical waveguides in telecommunications, and advanced photonics; and optoelectronic devices.

The thin films may also be used as physical and chemical barrier coatings including, invisible metal and plastics protection, invisible protection for delicate optical surfaces.

The thin films may also be used as anti-fogging coatings for applications including automotive and marine glass, architectural glass, spectacles, windows of all sorts, bathroom mirrors and shower screens.

The films may also be produced with an additional component imbedded in the porous network to make the film an active coating. The nanoporous structure of the film also makes it potentially useful as a nanosieve.

It will be appreciated by the person skilled in the art that the above films may be formed on or applied to glass surfaces that are already in place, such as existing windows and mirrors. In aftermarket applications the precursor solution may be mixed with the curing agent immediately prior to application, mixed during application such as through a common spray nozzle or after the precursor solution has been applied to a substrate. The precursor solution may be applied by coating, wiping or spraying the respective component onto the substrate being treated. The curing agent may be any gaseous or aqueous strong alkali, including ammonia, alkali metal hydroxides, quaternary alkyl ammonium hydroxides and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a film coated on a substrate including the steps of:
    producing a precursor solution by dissolving a film precursor compound in an organic solvent, the film precursor compound comprising at least two hydrolysable groups bonded to a metal or metalloid;
    coating a substrate with the precursor solution, the film precursor compound therein remaining substantially unhydrolysed; and
    curing the precursor solution onto the substrate in a gaseous non-neutral pH environment comprising vaporous base, water and an organic solvent to thereby initiate hydrolysis and condensation reactions of the film precursor compound and cause adhesion of the forming film to the substrate,
    wherein at least one of organic solvent content of the precursor solution and the organic solvent content in the gaseous environment are controlled to control characteristics of the film.

2. The method of claim 1 wherein the film precursor compound is a metal alkoxide or a metalloid alkoxide.

3. The method of claim 2 wherein the metal or metalloid alkoxide is an oligomer.

4. The method of claim 1 wherein the metal or metalloid is selected from the group consisting of silicon, germanium, tin, lead, titanium, zirconium, hafnium, vanadium, niobium, tantalum, chromium, molybdenum, tungsten, yttrium, magnesium, calcium, strontium, barium, lead, zinc, cadmium, mercury, boron, aluminum, gallium, indium, and combinations thereof.

5. The method of claim 1 wherein the film precursor compound is an oligomeric organosilicate.

6. The method of claim 5 wherein the oligomeric organosilicate has a number n of repeating units between 2 to 10.

7. The method of claim 1 wherein the organic solvent in the precursor solution and the gaseous non-neutral pH environment are independently selected from the group consisting of an alcohol, a ketone, an amide and an ester.

8. The method of claim 7 wherein the organic solvent in the precursor solution and the gaseous non-neutral pH environment is an alcohol.

9. The method of claim 1 wherein the coating step is carried out by spin coating, dip coating, spray coating, fog coating, meniscus coating, slot coating, screen printing, roll coating or curtain coating.

10. The method of claim 1 wherein the base is ammonia.

11. The method of claim 1 wherein the steps are carried out at room temperature and atmospheric pressure.

12. The method of claim 1 wherein a pore size of the film is related to the size of the organic solvent molecule in the precursor solution or the gaseous environment.

13. The method of claim 1 wherein the organic solvent content in the precursor solution and/or the gaseous non-neutral pH environment relates to a pore density of the film.

* * * * *